United States Patent
Lee et al.

(10) Patent No.: US 10,423,723 B2
(45) Date of Patent: Sep. 24, 2019

(54) APPARATUS AND METHOD FOR EXTRACTING SEMANTIC TOPIC

(71) Applicant: Korea University Research and Business Foundation, Seoul (KR)

(72) Inventors: Sang Keun Lee, Seoul (KR); Md Hijbul Alam, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 601 days.

(21) Appl. No.: 14/729,306

(22) Filed: Jun. 3, 2015

(65) Prior Publication Data
US 2015/0268930 A1 Sep. 24, 2015

Related U.S. Application Data

(63) Continuation of application No. PCT/KR2013/011207, filed on Dec. 5, 2013.

(30) Foreign Application Priority Data

Dec. 6, 2012 (KR) .................. 10-2012-0141313

(51) Int. Cl.
*G06F 17/27* (2006.01)
*G06F 16/36* (2019.01)
(Continued)

(52) U.S. Cl.
CPC ............ *G06F 17/2785* (2013.01); *G06F 7/24* (2013.01); *G06F 16/36* (2019.01);
(Continued)

(58) Field of Classification Search
CPC .................................................. G06F 17/2785
See application file for complete search history.

(56) References Cited

U.S. PATENT DOCUMENTS

| 7,853,596 B2 | 12/2010 | Ma |
| 2011/0106807 A1* | 5/2011 | Srihari ............. G06F 17/30604 707/739 |
| 2012/0095952 A1 | 4/2012 | Archambeau |

FOREIGN PATENT DOCUMENTS

| JP | 2010-198278 A | 9/2010 |
| JP | 2011-150450 A | 8/2011 |
| JP | 2011-530729 A | 12/2011 |

OTHER PUBLICATIONS

Li et al, Sentiment Analysis with Global Topics and Local Dependency; Dated: 2010; Publication venue: AAAI; pp. 1371-1376.*

(Continued)

*Primary Examiner* — Amanda L Willis
(74) *Attorney, Agent, or Firm* — Pearne & Gordon LLP

(57) ABSTRACT

In accordance with a first exemplary embodiment, there is provided a method for extracting semantic topics from document sets in which opinions about an object are described using an apparatus capable of calculating a probability distribution. The method include (a) extracting word distributions about sentiment global topics and sentiment local topics; (b) extracting a global topic distribution, a local topic distribution and sentiment distributions about the global and local topics from the document sets; (c) performing statistical inference about each of the distributions extracted in the step (a) and the step (b); (d) extracting a global or local topic and a sentiment relevant to the global or local topic from the distributions of the inference performed in the step (c); and (e) extracting a word from the word distributions about sentiment global topics or sentiment local topics on the basis of the topic and sentiment extracted in the step (d).

7 Claims, 7 Drawing Sheets

(51) Int. Cl.
*G06F 16/9535* (2019.01)
*G06Q 10/10* (2012.01)
*G06F 7/24* (2006.01)
*G06N 7/00* (2006.01)

(52) U.S. Cl.
CPC ......... *G06F 16/9535* (2019.01); *G06N 7/005* (2013.01); *G06Q 10/10* (2013.01)

(56) References Cited

OTHER PUBLICATIONS

International Search Report for PCT/KR2013/011207 dated Feb. 24, 2014.

\* cited by examiner

FIG. 2

| Symbol | Description |
|---|---|
| $M, N$ | NUMBER OF DOCUMENTS AND NUMBER OF WORDS IN DOCUMENTS |
| $Y, S$ | NUMBER OF SENTIMENTS AND NUMBER OF SENTENCES |
| $T$ | NUMBER OF SENTENCES IN SLIDING WINDOW |
| $K^{gl}, K^{loc}$ | NUMBER OF GLOBAL TOPICS AND NUMBER OF LOCAL TOPICS |
| $v, w$ | SLIDING WINDOW AND WORD |
| $z, l, d$ | TOPIC, SENTIMENT, AND DOCUMENT |
| $r$ | TOPIC CONTEXT VARIABLE INDICATING WHETHER TOPIC IS GLOBAL OR LOCAL |
| $\varphi$ | MULTINOMIAL DISTRIBUTION OF WORD |
| $\theta_{d,l}^{gl}$ | MULTINOMIAL DISTRIBUTION OF GLOBAL TOPIC |
| $\theta_{d,l}^{loc}$ | MULTINOMIAL DISTRIBUTION OF LOCAL TOPIC |
| $\xi$ | MULTINOMIAL DISTRIBUTION OF SENTIMENT |
| $\pi$ | MULTINOMIAL DISTRIBUTION OF TOPIC CONTEXT |
| $\psi$ | CATEGORICAL DISTRIBUTION OF SLIDING WINDOW |
| $\alpha^{gl}, \alpha^{loc}$ | DIRICHLET PRIOR ABOUT GLOBAL TOPIC DISTRIBUTION AND DIRICHLET PRIOR ABOUT LOCAL TOPIC DISTRIBUTION |
| $\alpha_r^{mix}$ | DIRICHLET PRIOR ABOUT CONTEXT DISTRIBUTION |
| $\beta, \delta, \gamma$ | DIRICHLET PRIOR ABOUT WORD DISTRIBUTION, DIRICHLET PRIOR ABOUT SENTIMENT DISTRIBUTION, AND DIRICHLET PRIOR ABOUT SLIDING WINDOW DISTRIBUTION |

| Symbol | Description |
|---|---|
| $n^{gl,z,l}$ | NUMBER OF WORDS ASSIGNED TO GLOBAL TOPIC z AND SENTIMENT l |
| $n_w^{gl,z,l}$ | NUMBER OF TIMES OF WORDS ASSIGNED TO GLOBAL TOPIC z AND SENTIMENT l |
| $n^{loc,z,l}$ | NUMBER OF WORDS ASSIGNED TO LOCAL TOPIC z AND SENTIMENT l |
| $n_w^{loc,z,l}$ | NUMBER OF TIMES OF WORDS ASSIGNED TO LOCAL TOPIC z AND SENTIMENT l |
| $n_v^{d,s}$ | NUMBER OF WORDS EXTRACTED FROM SENTENCE s ASSIGNED TO SLIDING WINDOW v IN DOCUMENT d |
| $n^{d,s}$ | NUMBER OF WORDS IN SENTENCE s of DOCUMENT d |
| $n_{gl}^{d,v}$ | NUMBER OF WORDS EXTRACTED FROM WINDOW v ASSIGNED TO GLOBAL TOPIC IN DOCUMENT d |
| $n_{loc}^{d,v}$ | NUMBER OF WORDS ASSIGNED TO WINDOW v OF DOCUMENT d |
| $n^{d,v}$ | NUMBER OF WORDS ASSIGNED TO GLOBAL TOPIC OF DOCUMENT d |
| $n^{d,gl}$ | NUMBER OF WORDS ASSIGNED TO GLOBAL TOPIC AND SENTIMENT l OF DOCUMENT d |
| $n_l^{d,gl}$ | NUMBER OF WORDS ASSIGNED TO GLOBAL TOPIC z AND SENTIMENT l OF DOCUMENT d |
| $n_z^{d,gl,l}$ | NUMBER OF WORDS ASSIGNED TO LOCAL TOPIC OF DOCUMENT d |
| $n_l^{d,v,loc}$ | NUMBER OF WORDS ASSIGNED TO LOCAL TOPIC AND SENTIMENT l OF DOCUMENT d |
| $n_z^{d,v,l,loc}$ | NUMBER OF WORDS ASSIGNED TO LOCAL TOPIC z AND SENTIMENT l OF DOCUMENT d |

FIG. 7

$$P(v_{d,i} = v, r_{d,i} = gl, l_i = l, z_{d,i} = z | \mathbf{v}', \mathbf{r}', \mathbf{l}', \mathbf{z}', \mathbf{w}) \propto \frac{n_{w_{d,i}}^{gl,z,l} + \beta^{gl}}{n^{gl,z,l} + V\beta^{gl}} \times \frac{n_v^{d,s} + \gamma}{n^{d,s} + T\gamma} \times \frac{n_{gl}^{d,v} + \alpha_{gl}^{mix}}{n^{d,v} + \sum_{r' \in \{gl,loc\}} \alpha_{r'}^{mix}}$$

$$\times \frac{n_l^{d,gl} + \delta}{n^{d,gl} + Y\delta} \times \frac{n_z^{d,gl,l} + \alpha^{gl}}{n_l^{d,gl} + K^{gl}\alpha^{gl}} . \quad (1)$$

$$P(v_{d,i} = v, r_{d,i} = loc, l_i = l, z_{d,i} = z | \mathbf{v}', \mathbf{r}', \mathbf{l}', \mathbf{z}', \mathbf{w}) \propto \frac{n_{w_{d,i}}^{loc,z,l} + \beta^{loc}}{n^{loc,z,l} + V\beta^{loc}} \times \frac{n_v^{d,s} + \gamma}{n^{d,s} + T\gamma} \times \frac{n_{loc}^{d,v} + \alpha_{loc}^{mix}}{n^{d,v} + \sum_{r' \in \{gl,loc\}} \alpha_{r'}^{mix}}$$

$$\times \frac{n_l^{d,v,loc} + \delta}{n_{loc}^{d,v} + Y\delta} \times \frac{n_z^{d,v,l,loc} + \alpha^{loc}}{n_l^{d,v,loc} + K^{loc}\alpha^{loc}} . \quad (2)$$

$$\varphi_{z,l}^{loc}(w) = \frac{n_w^{loc,z,l} + \beta^{loc}}{n^{loc,z,l} + V\beta^{loc}} . \quad (3)$$

APPARATUS AND METHOD FOR EXTRACTING SEMANTIC TOPIC

CROSS-REFERENCE TO RELATED APPLICATION

This Application is a continuation application of PCT Application No. PCT/KR2013/011207 filed on Dec. 5, 2013, which claims the benefit of Korean Patent Application No. 10-2012-0141313 filed on Dec. 6, 2012, the entire disclosures of which are incorporated herein by reference.

TECHNICAL FIELD

The embodiments described herein pertain generally to an apparatus and a method for extracting a semantic topic.

BACKGROUND

A technology of extracting a semantic topic from a document is one of the most attention-attracting fields in recent years. In particular, as blogs or social network service sites gain popularity, a lot of research for automatically extracting opinions about an object in a text posted by a user on the Internet has been carried out.

However, according to a conventional method, it is impossible to automatically extract a topic including a sentiment-oriented ratable aspect of an object and a sentiment about the topic.

With regard to extracting a topic from a document, U.S. Patent Laid-open Publication No. 2012/0095952 ("COLLAPSED GIBBS SAMPLER FOR SPARSE TOPIC MODELS AND DISCRETE MATRIX FACTORIZATION") discloses a configuration for extracting a topic from a document corpus by generating a Dirichlet probability distribution using LDA (Latent Dirichlet Allocation) and an IBP (Indian Buffet Process) and performing inference using a collapsed Gibbs sampling algorithm.

Further, U.S. Pat. No. 7,853,596 ("Mining geographic knowledge using a location aware topic mode") discloses a configuration for extracting location information included in a document by generating a probability distribution using LDA (Latent Dirichlet Allocation) and performing inference using an EM (Expectation Maximization) algorithm.

DISCLOSURE OF THE INVENTION

Problems to be Solved by the Invention

The exemplary embodiments are provided to solve the above-described problems. There are provided an apparatus and a method for extracting a semantic topic, including automatically extracting a topic including a sentiment-oriented ratable aspect of an object and a sentiment about the topic.

Means for Solving the Problems

In accordance with a first exemplary embodiment, there is provided a method for extracting a semantic topic from one or more document sets in which opinions about an object are described using an apparatus capable of calculating a probability distribution. The method includes (a) extracting a word distribution about sentiment global topics and a word distribution about sentiment local topics; (b) extracting a global topic distribution, a sentiment distribution about the global topic, a local topic distribution, and a sentiment distribution about the local topic with respect to each document of the document sets; (c) performing statistical inference about each of the distributions extracted in the step (a) and the step (b); (d) extracting a global or local topic and a sentiment relevant to the global or local topic from the global topic distribution and the sentiment distribution about the global topic or the local topic distribution and the sentiment distribution about the local topic with respect to each word in each document of the document sets; and (e) extracting a word from the word distribution about sentiment global topics or the word distribution about sentiment local topics on the basis of the topic and sentiment extracted in the step (d).

In accordance with a second exemplary embodiment, there is provided an apparatus for extracting a semantic topic. The apparatus includes a document storage unit that stores one or more document sets in which opinions about an object are described; and a topic extraction unit that extracts a topic including a sentiment-oriented ratable aspect of the object and a sentiment about the topic from the document sets stored in the document storage unit. Wherein the topic extraction unit extracts a word distribution about sentiment topics, extracts a topic distribution and a sentiment distribution with respect to each document of the document sets, and extracts a topic and a sentiment from each of the extracted distributions with respect to each word in each document of the document sets.

BRIEF DESCRIPTION OF THE DRAWINGS

FIG. 2 illustrates marks used in the present disclosure;

FIG. 7 illustrates a statistical inference expression according to an exemplary embodiment.

MODE FOR CARRYING OUT THE INVENTION

Figure 1:
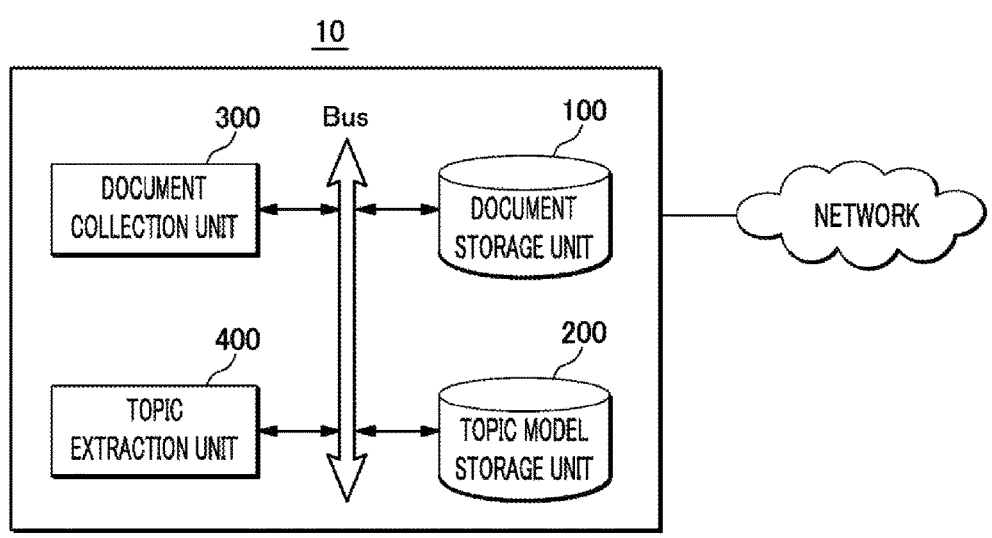
FIG. 1 illustrates an apparatus for extracting a semantic topic according to an exemplary embodiment.

Hereinafter, embodiments of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, the term "comprises or includes" and/or "comprising or including" used in the document means that one or more other components, steps, operation and/or existence or addition of elements are not excluded in addition to the described components, steps, operation and/or elements unless context dictates otherwise.

FIG. 1 illustrates a semantic topic extracting apparatus 10 according to an exemplary embodiment.

The semantic topic extracting apparatus 10 according to an exemplary embodiment includes a document storage unit 100 configured to store one or more document sets in which opinions about an object are described. Further, the semantic topic extracting apparatus 10 may further include a document collection unit 300 configured to collect document sets through a network such as the Internet and store the collected document sets in the document storage unit 100. Otherwise, the document sets may be previously constructed.

The semantic topic extracting apparatus 10 includes a topic extraction unit 400 configured to extract a semantic topic about the object from the document sets stored in the document storage unit 100. Further, the topic extraction unit 400 may extract a topic from the document sets using contents stored in a topic model storage unit 200 while updating the contents stored in the topic model storage unit 200. By way of example, the topic extraction unit 400 may use a sentiment word list stored in the topic model storage unit 200 to extract a topic. Further, the semantic topic extracting apparatus 10 may store the extracted topic and a topic model generated when extracting the topic in the topic model storage unit 200.

To be specific, the topic extraction unit 400 extracts a topic including a sentiment-oriented ratable aspect of the object from the document sets stored in the document storage unit 100 and a sentiment about the topic. That is, the topic extraction unit 400 extracts a topic distribution and a sentiment distribution with respect to each document of the document sets, and extracts a topic and a sentiment from each of the extracted distributions with respect to each word in each document of the document sets.

Herein, according to an exemplary embodiment, each probability distribution constructed and used by the topic extraction unit 400 to extract a topic may be constructed on the basis of a Dirichlet prior probability. Further, Gibbs sampling may be used to perform statistical inference of each distribution.

Using a probability distribution belongs to a category of research on a method for extracting a semantic topic from a document. This is a method for extracting a topic using a topic generative model which is constructed using a probability distribution and of which a latent variable is estimated by performing statistical inference.

In particular, as a method for extracting a semantic topic, LDA (Latent Dirichlet Allocation), which is a method for generating and constructing a topic using a Dirichlet distribution, has attracted attention, and various modified methods have also been suggested.

In LDA, each document is regarded as a mixture of various topics and a topic distribution is assumed to have a Dirichlet prior probability. The Dirichlet prior probability is used as a parameter in extracting or constructing a topic distribution with respect to each document and a word distribution with respect to each topic. A word included in a document is the sole observable variable. Further, all the other variables included in the extracted distribution are latent variables. Therefore, as described above, statistical inference is performed on the basis of a word included in a document. An apparatus and method for extracting a semantic topic according to an exemplary embodiment performs statistical inference using Gibbs sampling.

Such methods for extracting a semantic topic are used to extract an aspect of an object and a user's sentiment about the aspect in many cases. By way of example, if an object is a hotel, conventional methods for extracting a semantic topic are used to extract sentiments such as "good" and "bad" about aspects such as a location, transportation convenience, and service of the hotel from a document in which users' opinions are described.

A user may rate an object using, for example, a star-based rating system. For example, the user may give three stars to a "hotel A" and five stars to a "hotel B". The user may rate an aspect of the object. For example, the user may give 10 to service of the "hotel A" and 90 to service of the "hotel B".

Herein, it would be useful to automatically extract a star rating from a post of the user. The ratings given by the user to the object or the aspect of the object would be usefully used by a product and service provider as feedback on the object from the user. However, in a document collected from various information sources such as social network service sites, only an opinion and a sentiment of the user about the object are described. Therefore, in many cases, a rating given by the user to the object or the aspect of the object may not be included in the document.

The apparatus and method for extracting a semantic topic according to an exemplary embodiment has an advantage of being able to automatically extract a topic including a sentiment-oriented ratable aspect of an object from a document set, unlike the conventional methods.

Automatic extraction of a ratable aspect means that a sentiment of a user and an appropriate rating based thereon can be calculated even if the user does not give any stars or a star rating given by the user is not matched with a sentiment in a post actually written by the user.

By way of example, the apparatus and method for extracting a semantic topic according to an exemplary embodiment may extract topics such as convenience in facilities and service quality as sentiment-oriented ratable aspects of the hotel from the document. Further, the apparatus and method for extracting a semantic topic may extract sentiments of the user about the topics. The calculated sentiment-oriented ratable aspects and sentiments about the aspects may be used to calculate ratings of the aspects. Furthermore, the apparatus and method for extracting a semantic topic may be used to calculate a rating of the object on the basis of the calculated ratings of the respective aspects.

The conventional methods have shortcomings of being unable to extract a sentiment-oriented ratable aspect or being unable to automatically extract a sentiment-oriented ratable aspect. However, the apparatus and method for extracting a semantic topic according to an exemplary embodiment can extract both of a global topic and a local topic.

A global topic refers to an aspect, which can be used to distinguish an object from another object, among aspects of the object. Further, a local topic refers to a sentiment-oriented ratable aspect of an object. By way of example, from a document in which opinions about a hotel are described, the method for extracting a semantic topic according to an exemplary embodiment can extract whether the hotel is located in "Seoul" or "Jeju" as a global topic and also extract a service quality of the hotel as a local topic. The global topics are likely to be visible throughout a whole document, and the local topics are likely to be visible in only a few paragraphs of the document.

A global or local topic and a sentiment about the topic are highly likely to be close to each other in a document. By way of example, sentiment words such as "smells", "dirty", and "stain" may be relevant to an aspect such as "cleanliness" of a hotel room.

Therefore, in order to effectively extract a topic and a sentiment corresponding thereto, the method for extracting a semantic topic according to an exemplary embodiment may use one or more sliding windows shifted in the document. The sliding windows may be useful in extracting, particularly, local topics, i.e., sentiment-oriented ratable aspects of an object since the sentiment-oriented ratable aspects of the object are highly likely to be described as being close to each other rather than being scattered in the document. By way of example, access convenience of the hotel may be described in the first half of the document and a service quality of the hotel may be described in the second half of the document.

Each probability distribution extracted with respect to a global topic or a local topic and a sentiment about the global topic or a sentiment about the local topic follows a multinomial distribution or a categorical distribution. Further, in the method for extracting a semantic topic, as described above, a Dirichlet prior probability is used as parameters in constructing each distribution.

FIG. 2 illustrates marks used in the present disclosure. The marks illustrated in FIG. 2 will be used in the following descriptions.

By way of example, a document is marked as "d", a topic is marked as "z", a sentiment is marked as "l", a word is marked as "w", a sliding window is marked as "v", a global topic is marked as "gl", a local topic is marked as "loc", and the number or the number of times is generally marked as "n". Probability distributions with respect to a word, a topic, a sentiment, etc. are marked in Greek letters, respectively, and Greek letters are also assigned to Dirichlet prior probabilities of the respective probability distributions.

Further, in the following descriptions, "Dir( )" means that a Dirichlet distribution is generated on the basis of a factor in brackets.

Figure 3:
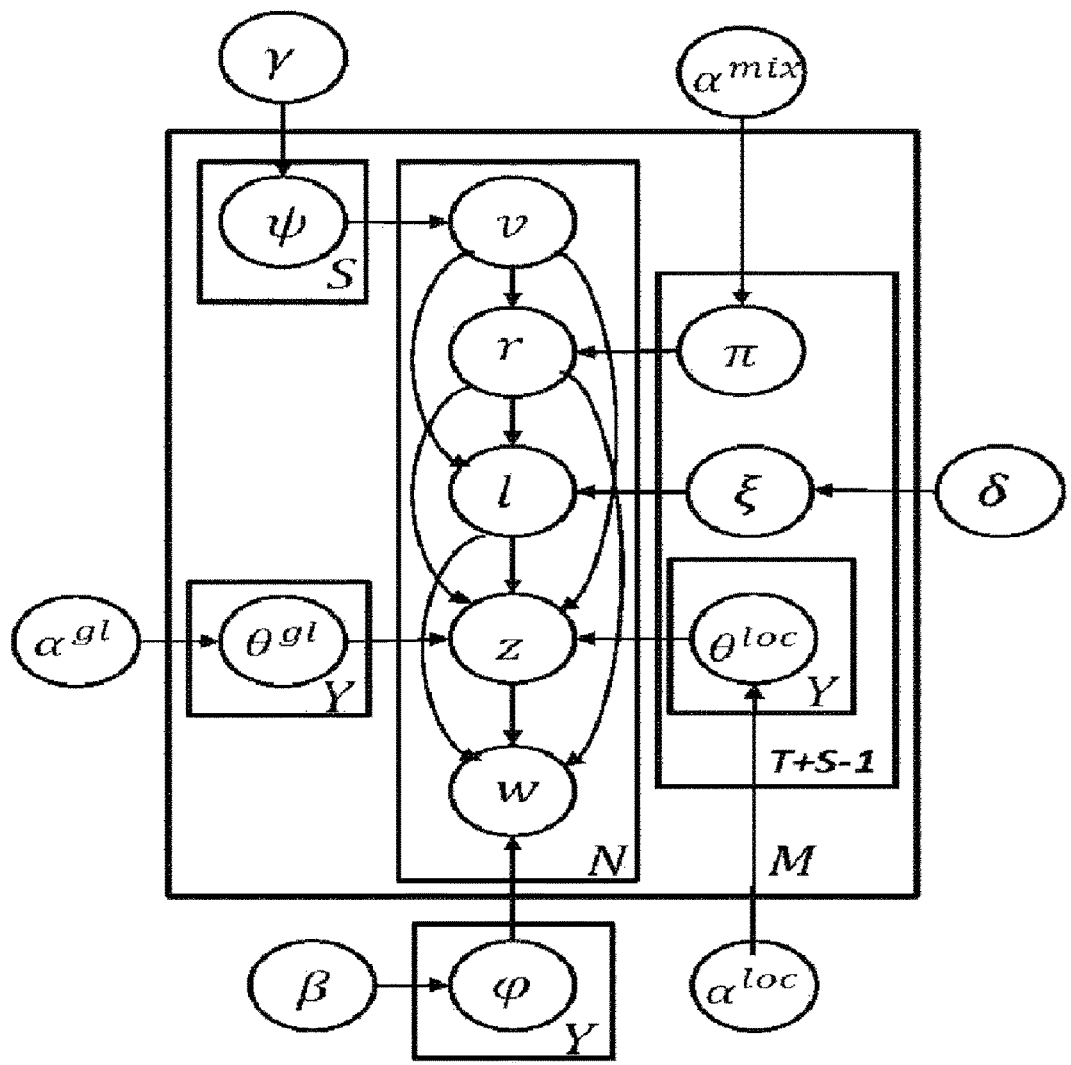
FIG. 3 illustrates a concept of a method for extracting a semantic topic according to an exemplary embodiment.

FIG. 3 illustrates a concept of a method for extracting a semantic topic according to an exemplary embodiment.

In the drawing, an order in obtaining probability distributions and variables is illustrated. By way of example, referring to the lower section of the drawing, it can be seen that a multinomial distribution of words, i.e., a word distribution, is calculated from a Dirichlet prior probability with respect to the word distribution and is used in finally extracting a word.

Each block of the method for extracting a semantic topic according to an exemplary embodiment to be described below can be understood through the present concept diagram. Therefore, the present concept diagram may be referred to in the following descriptions. However, the present concept diagram is a summary of the blocks of FIG. 4 to FIG. 6 into a diagram, and, thus, detailed explanation thereof will be omitted.

Figure 4:
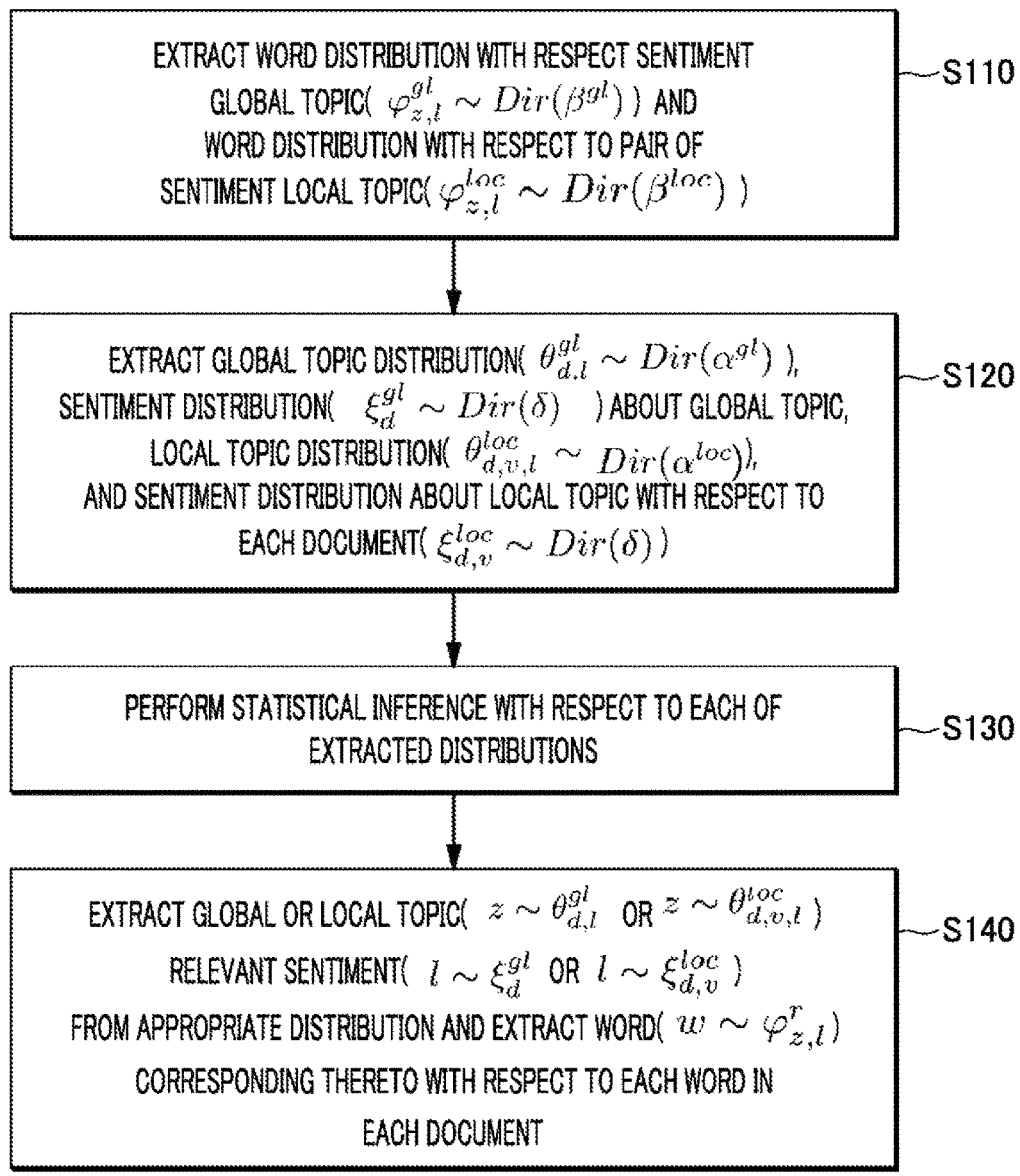
FIG. 4 illustrates a flow of a method for extracting a semantic topic according to an exemplary embodiment.

FIG. 4 illustrates a flow of a method for extracting a semantic topic according to an exemplary embodiment.

In the method for extracting a semantic topic, a word distribution with respect to sentiment global topics and a word distribution with respect to sentiment local topics are extracted (S110). The sentiment global topic means a global topic for any sentiment. And the sentiment local topic means a local topic for any sentiment. Otherwise, the sentiment global topic may be a global topic-sentiment pair and the sentiment local topic may be a local topic-sentiment pair. That is, in the method for extracting a semantic topic, probability distributions are constructed on the basis of Dirichlet prior probabilities with respect to words constituting a global topic, words constituting a sentiment about the global topic, words constituting a local topic, and words constituting a sentiment about the local topic. By way of example, words constituting a sentiment about a global or local topic may include "good", "bad", etc.

Then, in the method for extracting a semantic topic, a global topic distribution, a sentiment distribution about the global topic, a local topic distribution, and a sentiment distribution about the local topic are extracted with respect to each document (S120). Details of this block will be described later with reference to FIG. 5.

Then, in the method for extracting a semantic topic, statistical inference is performed with respect to each of the extracted distributions (S130). Details of this block will be described later with reference to the expression in FIG. 7.

Then, in the method for extracting a semantic topic, a global or local topic and a relevant sentiment are extracted from an appropriate distribution and a word corresponding thereto is extracted, with respect to each word in each document (S140). Details of this block will be described later with reference to FIG. 6.

Figure 5:
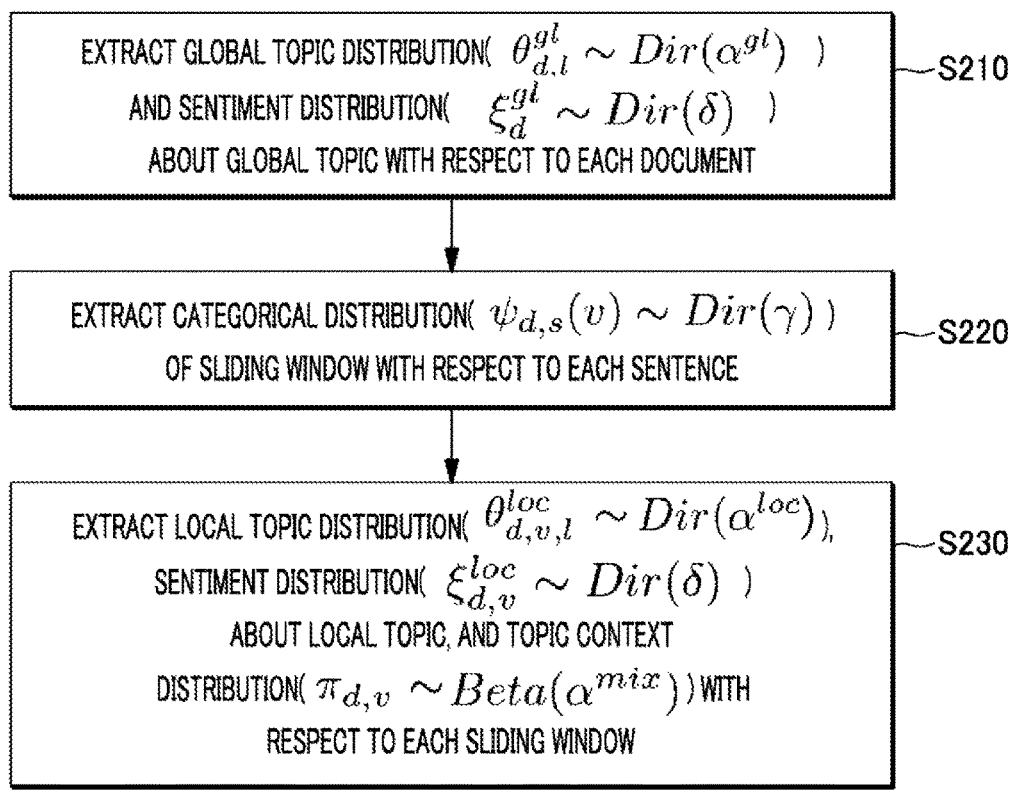
FIG. 5 illustrates a flow of a method for generating a semantic topic model according to an exemplary embodiment.

FIG. 5 illustrates a flow of a method for generating a semantic topic model according to an exemplary embodiment.

Firstly, in the method for extracting a semantic topic, with respect to each document, a global topic distribution and a sentiment distribution about the global topic are extracted (S210). The global topic, i.e., an object to distinguish an object from another object, is highly likely to be described throughout the whole document, and, thus, it is efficient to extract the global topic before selecting and shifting a sliding window. The sentiment about the global topic is highly likely to be described as being close to the global topic in the document, and, thus, it is extracted together with the global topic.

Then, in the method for extracting a semantic topic, with respect to each sentence, a categorical distribution of a sliding window is extracted (S220), and with respect to each sliding window, a local topic distribution, a sentiment distribution about the local topic, and a topic context distribution are extracted (S230). A size of the sliding window is set for a word expressing a local topic and a word expressing a sentiment about the local topic to be extracted together.

The topic context distribution is a distribution of preference for a global topic or a local topic. That is, a global topic is mainly extracted from the whole document and a local topic is extracted in a range of a sliding window, and the global topic and the local topic may be extracted together in the range of a sliding window. Therefore, in the method for extracting a semantic topic, one or more sliding windows are selected and shifted to be overlapped with each other in order to extract all of topics in various categories.

Figure 6:
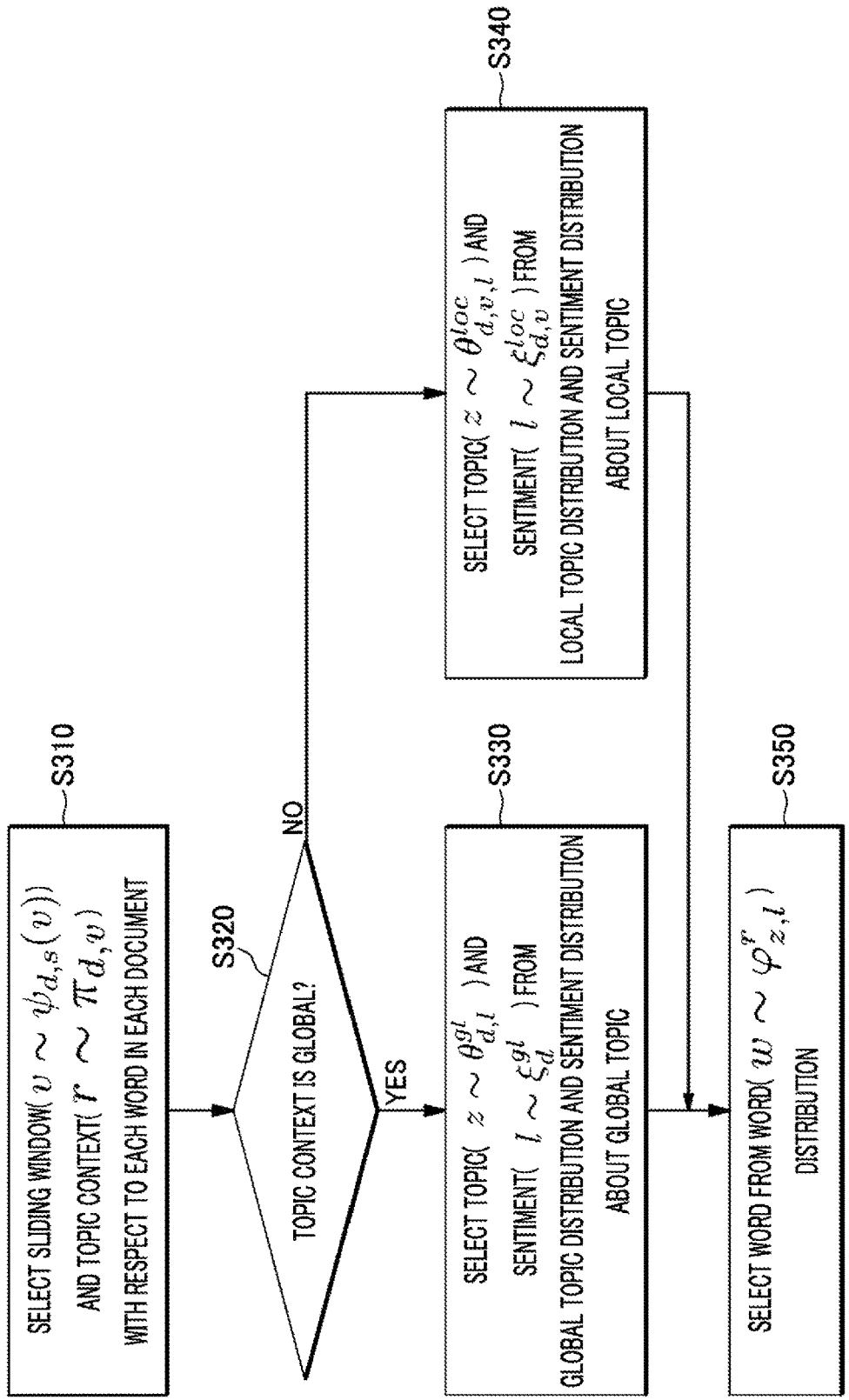
FIG. 6 illustrates a flow of a method for using a semantic topic model according to an exemplary embodiment.

FIG. 6 illustrates a flow of a method for using a semantic topic model according to an exemplary embodiment.

In the method for extracting a semantic topic, with respect to each word in each document, a sliding window and a topic context are selected (S310), and if the topic context is global (S320), a topic and a sentiment are selected from a global topic distribution and a sentiment distribution about the global topic (S330). In the method for extracting a semantic topic, if the topic context is not global, a topic and a sentiment are selected from a local topic distribution and a sentiment distribution about the local topic (S340). As described above, the topic context is a distribution of preference for a global topic or a local topic. Therefore, in the above-described blocks, a topic for extracting a word according to the topic context and a sentiment corresponding thereto are automatically selected from a global topic or a local topic.

Then, in the method for extracting a semantic topic, a word is selected from a word distribution (S350). As such, in the method for extracting a semantic topic, extraction of a semantic topic extracted from a document set in which opinions about an object and an aspect of the object are described is completed.

FIG. 7 illustrates a statistical inference expression according to an exemplary embodiment.

As described above, statistical inference according to an exemplary embodiment uses Gibbs sampling.

In the drawing, an expression (1) and an expression (2) respectively represent sampling distributions about a given word when a context is global or local. That is, the expression (1) represents the probability that a sliding window, a context, a sentiment, and a topic are v, gl, l, and z, respectively, and the expression (2) represents the probability that a sliding window, a context, a sentiment, and a topic are v, loc, l, and z, respectively. Since v', r', l', and z' are assignment vectors for a sliding window, a context, a sentiment, and a topic, respectively, they are relevant to all words expect a word for a location i in a document d.

$P(w, v, r, z, l)$ is $P(w|r, z, l)P(v, r, z, l)$, and $P(v, r, z, l)$ is $P(z|r, v, l)P(l|r, v)P(r|v)P(v)$. Therefore, in the method for extracting a semantic topic, an expression can be drawn by expressing such a conditional probability in a Markov chain.

In the drawing, an expression (3) is provided for obtaining a distribution of words approximated to a local topic z and a sentiment l. Therefore, it is possible to calculate a word distribution about sentiment-oriented ratable aspects using the expression (3).

Meanwhile, the semantic topic extracting apparatus 10 illustrated in FIG. 1 is just one exemplary embodiment, and, thus, the present disclosure is not limited by FIG. 1. That is, according to various exemplary embodiments, the semantic topic extracting apparatus 10 may have a different configuration from that of FIG. 1. Details thereof will be described below.

The semantic topic extracting apparatus 10 according to another exemplary embodiment includes a memory and a processor.

A semantic topic extraction program is stored in the memory. Herein, the memory is a common name for a non-volatile storage device that retains stored information even when it is not supplied with electric power and a volatile storage device that needs electric power to retain stored information.

The processor stores one or more document sets, in which opinions about an object are described, in the memory when the program stored in the memory is executed. Further, the processor extracts a topic including a sentiment-oriented ratable aspect of the object and a sentiment about the topic from the document sets stored in the memory.

Herein, the processor extracts a word distribution about sentiment topics. Further, the processor extracts a topic distribution and a sentiment distribution from the document sets stored in the memory, and extracts a topic and a sentiment from the extracted topic distribution and sentiment distribution, respectively, with respect to each word in each document of the document sets.

As such, the processor can perform the same roles as the document collection unit 300 and the topic extraction unit 400, respectively. Further, the memory performs the same roles as the document storage unit 100 and the topic model storage unit 200, respectively, and, thus, stores a document set and a topic model therein.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

We claim:

1. A method for automatically extracting one or more semantic topics from one or more electronic document sets in which user's opinions of an object are described using an apparatus capable of calculating a probability distribution, the method comprising:

(a) extracting, by a processor, a global word distribution from a plurality of global topic-sentiment pairs and a local word distribution from a plurality of local topic-sentiment pairs;

(b) extracting, by the processor, a global topic distribution corresponding to words constituting a global topic, a global sentiment distribution corresponding to words constituting a first sentiment about the global topic, a local topic distribution corresponding to words constituting a local topic, and a local sentiment distribution corresponding to words constituting a second sentiment about the local topic with respect to each document of the electronic document sets;

(c) performing, by the processor, statistical inference about each of the global word distribution, the local word distribution, the global topic distribution, the global sentiment distribution, the local topic distribution and the local sentiment distribution extracted in the step (a) and step (b);

(d) with respect to each document of the electronic document sets, extracting, by the processor, a first global topic from the global topic distribution and the global sentiment distribution, and a first local topic from the local topic distribution and the local sentiment distribution, and extracting, by the processor, a third sentiment relevant to the first global topic and a fourth sentiment relevant to the first local topic; and (e) extracting, by the processor, one or more words from the global word distribution and the local word distribution on the basis of the first global topic, the first local topic, the third sentiment relevant to the first global topic and the fourth sentiment relevant to the first local topic, wherein each of the plurality of the global topic-sentiment pairs includes a first word expressing the global topic and a second word expressing the sentiment about the global topic, and each of the plurality of the local topic-sentiment pairs includes a third word expressing the local topic and a fourth word expressing the sentiment about the local topic, wherein the step (b) includes:

extracting, by the processor, the global topic distribution and the global sentiment distribution about the global topic from the each document;

shifting, by the processor, one or more sliding windows overlapped with each other in each document;

extracting, by the processor, a categorical distribution of the sliding window; and extracting, by the processor, the local topic distribution, the local sentiment distribution about the local topic and a topic context distribution based on words extracted from a sentence in the one or more sliding window;

wherein a size of the one or more sliding windows is set for the third word expressing the local topic and the fourth word expressing the sentiment about the local topic to be extracted together, wherein the step (d) includes:

selecting a first sliding window and a first topic context with respect to each document;

if the first topic context is global, selecting the first global topic and the third sentiment relevant to the first global topic from the global topic distribution and the global sentiment distribution; and, if the first topic context is local, selecting the first local topic and the fourth sentiment relevant to the first local topic from the local topic distribution and the local sentiment distribution;

wherein the global topic includes a first group of aspects that are used to only distinguish the object from another object among aspects of the object, and the local topic includes a second group of aspects that are sentiment-oriented and are used to calculate a rating of the object, wherein the one or more words extracted in the step (e) includes the first global topic of the object, the first local topic of the object, the third sentiment relevant to the first global topic and the fourth sentiment relevant to the first local topic, and wherein the first global topic, the first local topic, the third sentiment relevant to the first global topic and the fourth sentiment relevant to the first local topic are used to calculate a rating of the object and a rating of the aspect of the object.

2. The method of claim 1, wherein each of the global word distribution, the local word distribution, the global topic distribution, the global sentiment distribution, the local topic distribution and the local sentiment distribution is based on a multinomial distribution or a categorical distribution.

3. The method of claim 2, wherein each of the global word distribution, the local word distribution, the global topic distribution, the global sentiment distribution, the local topic distribution and the local sentiment distribution is constructed on basis of a Dirichlet prior probability.

4. The method of claim 1, wherein the statistical inference uses a Gibbs sampling algorithm.

5. An apparatus for automatically extracting one or more semantic topics, comprising:

a storage memory medium configured to store steps of a semantic topic extraction program;

a document storage that stores one or more electronic document sets in which user's opinions of an object are described; and a processor configured to execute the steps of the semantic topic extraction program and that extracts a global topic including a first group of aspects that are used to only distinguish the object from another object among aspects of the object, a local topic including a second group of aspects that are sentiment-oriented and are used to calculate a rating of the object, and a sentiment about the global topic or the local topic from the electronic document sets stored in the document storage, wherein the processor extracts a global word distribution from a plurality of global topic-sentiment pairs and a local word distribution from a plurality of local topic-sentiment pairs, wherein each of the plurality of the global topic-sentiment pairs includes a first word expressing the global topic and a second word expressing the sentiment about the global topic, and each of the plurality of the local topic-sentiment pairs includes a third word expressing the local topic and a fourth word expressing the sentiment about the local topic, extracts a global topic distribution corresponding to words constituting the global topic, a global sentiment distribution corresponding to words constituting a first sentiment about the global topic, a local topic distribution corresponding to words constituting the local topic, and a local sentiment distribution corresponding to words constituting a second sentiment about the local topic with respect to each document of the electronic document sets, performs statistical inference about each of the global word distribution, the local word distribution, the global topic distribution, the global sentiment distribution, the local topic distribution and the local sentiment distribution extracted, extracts a first global topic from the global topic distribution and the global sentiment distribution, and a first local topic from the local topic distribution and the local sentiment distribution, and extracts a third sentiment relevant to the first global topic and a fourth sentiment relevant to the first local topic, with respect to each document of the electronic document sets, and extracts one or more words from the global word distribution and the local word distribution on the basis of the first global topic, the first local topic, the third sentiment relevant to the first global topic and the fourth sentiment relevant to the first local topic, wherein the processor extracts the global topic distribution, the global sentiment distribution, by extracting the global topic distribution and the global sentiment distribution about the global topic from the each document, shifting one or more sliding windows overlapped with each other in each document, extracting a categorical distribution of the sliding window, and extracting the local topic distribution, the local sentiment distribution about the local topic and a topic context distribution based on words extracted from a sentence in the one or more sliding window, wherein a size of the one or more sliding windows is set for the third word expressing the local topic and the fourth word expressing the sentiment about the local topic to be extracted together, wherein the processor extracts the first global topic, the first local topic, the third sentiment relevant to the first global topic and the fourth sentiment relevant to the first local topic, by selecting a first sliding window and a first topic context with respect to each document, selecting, if the first topic context is global, the first global topic and the third sentiment relevant to the first global topic from the global topic distribution and the global sentiment distribution, and selecting, if the first topic context is local, the first local topic and the fourth sentiment relevant to the first local topic from the local topic distribution and the local sentiment distribution, wherein the one or more words extracted from the global word distribution and the local word distribution includes the first global topic of the object, the first local topic of the object, the third sentiment relevant to the first global topic and the fourth sentiment relevant to the first local topic, and wherein the first global topic, the first local topic, the third sentiment relevant to the first global topic and the fourth sentiment relevant to the first local topic are used to calculate a rating of the object and a rating of the aspect of the object.

6. The apparatus of claim 5, wherein each of the global word distribution, the local word distribution, the global topic distribution, the global sentiment distribution, the local topic distribution and the local sentiment distribution is constructed on basis of a Dirichlet prior probability.

7. The apparatus of claim 5, wherein the processor uses Gibbs sampling in statistical inference of each of the global word distribution, the local word distribution, the global topic distribution, the global sentiment distribution, the local topic distribution and the local sentiment distribution.

* * * * *